(12) United States Patent  
Peng et al.

(10) Patent No.: US 12,080,084 B2  
(45) Date of Patent: Sep. 3, 2024

(54) SCENE TEXT DETECTION METHOD AND SYSTEM BASED ON SEQUENTIAL DEFORMATION

(71) Applicants: Tsinghua University, Beijing (CN); HYUNDAI MOTOR COMPANY, Seoul (KR); Kia Corporation, Seoul (KR)

(72) Inventors: Liangrui Peng, Beijing (CN); Shanyu Xiao, Beijing (CN); Ruijie Yan, Beijing (CN); Gang Yao, Beijing (CN); Shengjin Wang, Beijing (CN); Jaesik Min, Gyeonggi (KR); Jong Ub Suk, Seoul (KR)

(73) Assignees: TSINGHUA UNIVERSITY, Beijing (CN); HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 455 days.

(21) Appl. No.: 17/407,549

(22) Filed: Aug. 20, 2021

(65) Prior Publication Data

US 2022/0058420 A1 Feb. 24, 2022

(30) Foreign Application Priority Data

Aug. 22, 2020 (CN) .......................... 202010853196.4

(51) Int. Cl.
*G06V 20/62* (2022.01)
*G06F 18/214* (2023.01)
(Continued)

(52) U.S. Cl.
CPC ............ *G06V 20/63* (2022.01); *G06F 18/214* (2023.01); *G06N 3/04* (2013.01); *G06N 3/084* (2013.01);
(Continued)

(58) Field of Classification Search
CPC ...... G06V 20/63; G06V 10/225; G06V 10/40; G06V 30/10; G06V 10/82; G06V 30/413;
(Continued)

(56) References Cited

U.S. PATENT DOCUMENTS

2019/0095753 A1\* 3/2019 Wolf ....................... G06F 18/21  
2020/0012876 A1\* 1/2020 Liu ........................ G06F 18/214  
(Continued)

FOREIGN PATENT DOCUMENTS

CN 108304835 A 7/2018  
CN 108549893 A 9/2018  
(Continued)

OTHER PUBLICATIONS

Office Action issued in corresponding Chinese Patent Application No. 202010853196.4 dated May 16, 2022, with English translation.
(Continued)

*Primary Examiner* — Michael Robert Cammarata  
*Assistant Examiner* — Pardis Sohraby  
(74) *Attorney, Agent, or Firm* — MORGAN, LEWIS & BOCKIUS LLP

(57) ABSTRACT

A method and a system for detecting a scene text may include extracting a first feature map for a scene image input based on a convolutional neural network, and delivering the first feature map to a sequential deformation module; obtaining sampled feature maps corresponding to sampling positions by performing iterative sampling for the first feature map, obtaining a second feature map by performing a concatenation operation in deep learning according to a channel dimension for the first feature map and the sampled feature maps; obtaining a third feature map by performing a feature aggregation operation for the second feature map in the channel dimension, and delivering the third feature map to the object detection baseline network; and performing text
(Continued)

area candidate box extraction for the third feature map and obtaining a text area prediction result as a scene text detection result through regression fitting.

18 Claims, 6 Drawing Sheets

(51) Int. Cl.
*G06N 3/04* (2023.01)
*G06N 3/084* (2023.01)
*G06V 10/22* (2022.01)
*G06V 10/40* (2022.01)
*G06V 30/10* (2022.01)

(52) U.S. Cl.
CPC ............ *G06V 10/225* (2022.01); *G06V 10/40* (2022.01); *G06V 30/10* (2022.01)

(58) Field of Classification Search
CPC ...... G06V 10/44; G06V 10/10; G06F 18/213; G06F 18/214; G06F 18/253; G06F 30/27; G06N 3/04; G06N 3/084; G06N 3/044; G06N 3/045; G06N 3/08
USPC ........................................................ 382/157
See application file for complete search history.

(56) References Cited

U.S. PATENT DOCUMENTS

| | | | |
|---|---|---|---|
| 2020/0026951 A1* | 1/2020 | Chowdhury | G06F 18/217 |
| 2020/0327384 A1* | 10/2020 | Zhang | G06V 30/153 |
| 2021/0224568 A1* | 7/2021 | Zhang | G06V 30/153 |

FOREIGN PATENT DOCUMENTS

| | | | | |
|---|---|---|---|---|
| CN | 110738090 A | | 1/2020 | |
| CN | 110751154 A | * | 2/2020 | ............ G06K 9/342 |
| CN | 111027443 A | | 4/2020 | |

OTHER PUBLICATIONS

Yuliang Liu et al, "Curved scene text detection via transverse and longitudinal sequence connection", Pattern Recognition, vol. 90, 2019, pp. 337-345.

Ruijie Yan et al, "Dynamic temporal residual network for sequence modeling", IJDAR 22, 2019.

* cited by examiner

SCENE TEXT DETECTION METHOD AND SYSTEM BASED ON SEQUENTIAL DEFORMATION

CROSS-REFERENCE TO RELATED APPLICATION

The present application claims priority to Chinese Patent Application No. 202010853196.4 filed in the Chinese National Intellectual Property Administration on Aug. 22, 2020, the entire contents of which is incorporated herein for all purposes by this reference.

BACKGROUND OF THE INVENTION

Field of the Invention

The present invention relates to an information processing technology field, and pertains to a sub field of technology related to image processing, computer vision, and machine learning. In particular, the present invention relates to a method and a system for detecting text in scene images implemented by designing a deep neural network.

Description of Related Art

In recent years, scene text detection technologies based on deep neural networks have been greatly developed. Convolutional neural networks (CNNs) are widely applied in scene text detection systems. However, scene text varies in several aspects including script, size, orientation, shape, and aspect ratio, and the receptive field of the CNN has an immanent limit for geometric transformation modeling. Scene text detection under an uncontrolled condition is still an open problem, and there is a high difficulty to perform text detection for an arbitrary-shape text area, such as curved text in a scene image.

Deep learning based scene text detection approaches may be generally divided into two categories. One category is instance level based object detection approach that utilizes a normal object detection framework (e.g., Faster R-CNN, SSD) with a text instance (word or text line) as a kind of object. Since the capability of this category of approaches is constrained by the fixed receptive field of convolutional neural network, a modeling capability for relatively large geometric deformation is still not sufficient.

The other category is component level based object detection approach that detects a text component by focusing on not the whole text instance but text components (e.g., a text segment, a character, a writing stroke, or finest grained pixels). In this category of approaches, a postprocessing step such as separate component grouping, e.g., pixel clustering or character block connection is required. The capability of this category of approaches is influenced by a component prediction error. Furthermore, since this category of approaches often requires a complicated postprocessing step, it is inconvenient to perform end-to-end integral optimization training.

The description of the background technology described above is intended for a deep understanding of the technique (used technical means, technical problems to be solved, and generated technical effects) of the present invention. The present invention should not be regarded as related art known to those skilled in the art and the present invention should not be regarded to imply an arbitrary form of technology The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a system for detecting text in scene images based on sequential deformation modeling.

The present invention includes a Sequential Deformation Module (SDM) and an Auxiliary Character countinging (ACC) supervised learning mechanism. Various aspects of the present invention are directed to providing a method and a system for detecting a scene text based on the sequential deformation module and the auxiliary text count supervised learning mechanism. The scene text detection system includes a feature extraction module, a sequential deformation module, an auxiliary character counting network, and an object detection baseline network.

The feature extraction module extracts a first feature map for a scene image input based on a convolutional neural network, and delivers the first feature map to a sequential deformation module;

the sequential deformation module obtains feature maps corresponding to a series of sampling positions by performing iterative sampling through predicting a series of offsets for each pixel point of an input first feature map, obtains a second feature map by performing a concatenation operation in deep learning for sampled feature maps obtained by the iterative sampling process with the first feature map according the channel dimension, and delivers the second feature map to the auxiliary character counting network;

the sequential deformation module also obtains a third feature map by performing a feature aggregation operation for the second feature map in the channel dimension, and delivers the third feature map to the object detection baseline network; and the object detection baseline network performs text area candidate box extraction for the input third feature map and obtains a text area prediction result as a scene text detection result through regression fitting.

In training stage, the object detection baseline network performs a training by adjusting a neural network node parameter by gradient descent method by use of various objective functions and deep neural network error back-propagation, the various objective functions include objective functions of text area classification and text area bounding box regression, and in the training stage, the object detection baseline network selects a text area candidate box in the object detection baseline network by use of sample ground-truth bounding box information, and selects a feature sequence on the second feature map by use of a center position of a positive candidate box matching a ground-truth bounding box and sends the selected feature sequence to the auxiliary character counting network.

The auxiliary character counting network performs character sequence modeling for the feature sequence selected in the positive candidate box of the second feature map, and predicts and generates a content-independent character sequence, and the objective function of the auxiliary character counting network adopts a negative log likelihood function generally used in deep learning sequence modeling; and the auxiliary character counting network configures the objective function for the content-independent character sequence prediction result by use of content-independent character information of a real text label of a corresponding text area, and forms an auxiliary character counting supervised learning mechanism through the objective function, and the objective function of the auxiliary character counting network and the objective functions of the object detection baseline network jointly participate in the training, which auxiliarly guides the sequential deformation module to adapt to deformation of various text areas.

The first feature map is a matrix with the size of H×W×C, wherein H represents the height of the feature map, W represents the width of the feature map, and C represents the number of channels of the feature map.

The sequential deformation module includes two separate sequence sampling networks and one convolution layer in which the size of the convolution kernel is 1×1 and the number of the convolution kernels is k, each of the two separate sequence sampling networks includes a bilinear sampler, a recurrent neural network, and a linear layer, the two separate sequence sampling networks sample features in two different directions starting at the same start position p on the first feature map and one sequence sampling network is provided in each time step, a current position is obtained by adding a current accumulative offset $p_{d,t}$ to the start position p on the first feature map, the bilinear sampler outputs a feature $x(p+p_{d,t})$ sampled for the current position $p+p_{d,t}$; 0≤time step t≤T, T represents a predetermined number of repetition times, d represents a direction from the start position, and d=1, 2; the recurrent neural network receives the sampled feature $x(p+p_{d,t})$ as an input, and generates a hidden state $h_{d,t}$, and the linear layer receives the hidden state $h_{d,t}$, predicts a 2D vector type offset $\Delta p_{d,t}$ for the current position $p+p_{d,t}$, and obtains a new cumulative offset $p_{d,t\to 3}$ by adding the predicted offset $\Delta p_{d,t}$ to the current cumulative offset $p_{d,t}$; and additionally selects a feature vector at a specific position in which the number of channels is (2T+1)·C on the second feature map m with the second feature map m by concatenation the first feature map x and the all sampled feature maps, and obtains a feature sequence in which a length is 2T+1 and the number of channels is C by reshaping the selected feature vector, and sets a feature sequence at a selection position as an input of the auxiliary character counting network; obtains a third feature map by performing a feature aggregation operation in a channel dimension of the second feature map m, and a feature aggregation operation is implemented by use of one convolution layer in which the size of the convolution kernel is 1×1, the number of convolution kernels is k, and k which is the number of convolution kernels is set to be equal to (2T+1)·C which is the number of channels of the second feature map.

The auxiliary character counting network is a sequence-to-sequence model in deep learning, and the auxiliary character counting network selects a feature vector at a specific position on an intermediate feature map m in which the number of channels is (2T+1)·C and obtains one feature sequence in which the length is 2T+1 and the number of channels is C by reshaping the feature vector to form a feature input of the auxiliary character counting network.

The auxiliary character counting network utilizes a single-layer multi-head self attention decoder, inputs the feature sequence, and inputs a start sign <SOS> or a sign predicted at a previous time step, and outputs a next prediction sign until outputting an end sign <EOS>.

According to various exemplary embodiments of the present invention, model parameter learning can be performed through deep learning based end-to-end multi-task optimization training without a complicated postprocessing step by use of all models including a feature extraction module, a sequential deformation module, an auxiliary character counting network, and an object detection baseline network. That is, during a training process, a multi-task objective function includes text area classification of the object detection baseline network and an objective function of text area bounding box regression, and a content-independent character sequence prediction objective function of the auxiliary character counting network. Through this, according to various exemplary embodiments of the present invention, finally, a system and a method for detecting a scene text can be implemented, which can be applied to deformation of various text areas.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
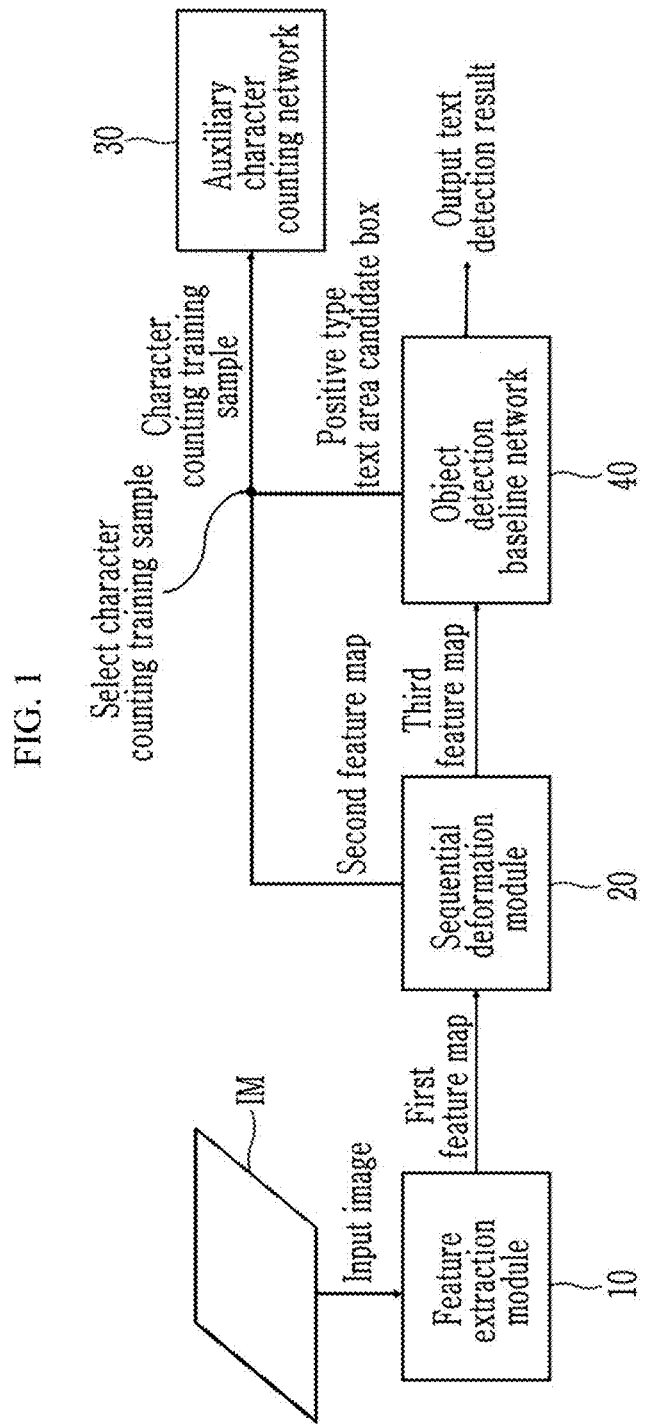
FIG. 1 is a flow schematic diagram of a method and a system for detecting a scene text based on a sequential deformation module and an auxiliary character counting supervised learning mechanism according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, of the present invention an exemplary embodiment of the present invention will be described with reference to the drawings, and in the accompanying drawings, the same or similar sign is used to represent the same or similar elements or elements having the same or similar function. Hereinafter, an exemplary embodiment described with reference to the drawings is an example for explaining the present invention, and the present invention may not be construed as limited by the exemplary embodiment of the present invention.

In various exemplary embodiments of the present invention, a text in a scene may be configured by a combination of a spoken language, a written language, a symbol, etc., like signs, instructions, posters, etc., located in a scene image. Moreover, a character in an auxiliary character counting means each of the spoken language, the written language, the symbol, etc.

FIG. 1 is a flow schematic diagram of a method and a system for detecting a scene text based on a sequential deformation module and an auxiliary character counting supervised learning mechanism according to various exemplary embodiments of the present invention.

A scene text detecting system 1 includes a feature extraction module 10, a sequential deformation module 20, an auxiliary character counting network 30, and an object detection baseline network 40.

The feature extraction module 10 based on a convolutional neural network extracts a first feature map from an input scene image IM. The sequential deformation module 20 repeatedly performs sampling for each pixel point of a first feature map by offset prediction to adapt to a change in shape of a text row area and obtain a feature map corresponding to a sampling location. The sequential deformation module 20 performs a general concatenation operation in deep learning for the feature map obtained by sampling with the first feature map according to a channel dimension to obtain a second feature map. The sequential deformation module 20 sends the second feature map to the auxiliary character counting network 30, performs a feature aggregation operation in the channel dimension of the second feature map to obtain a third feature map, and sends the third feature map to the object detection baseline network.

Figure 5:
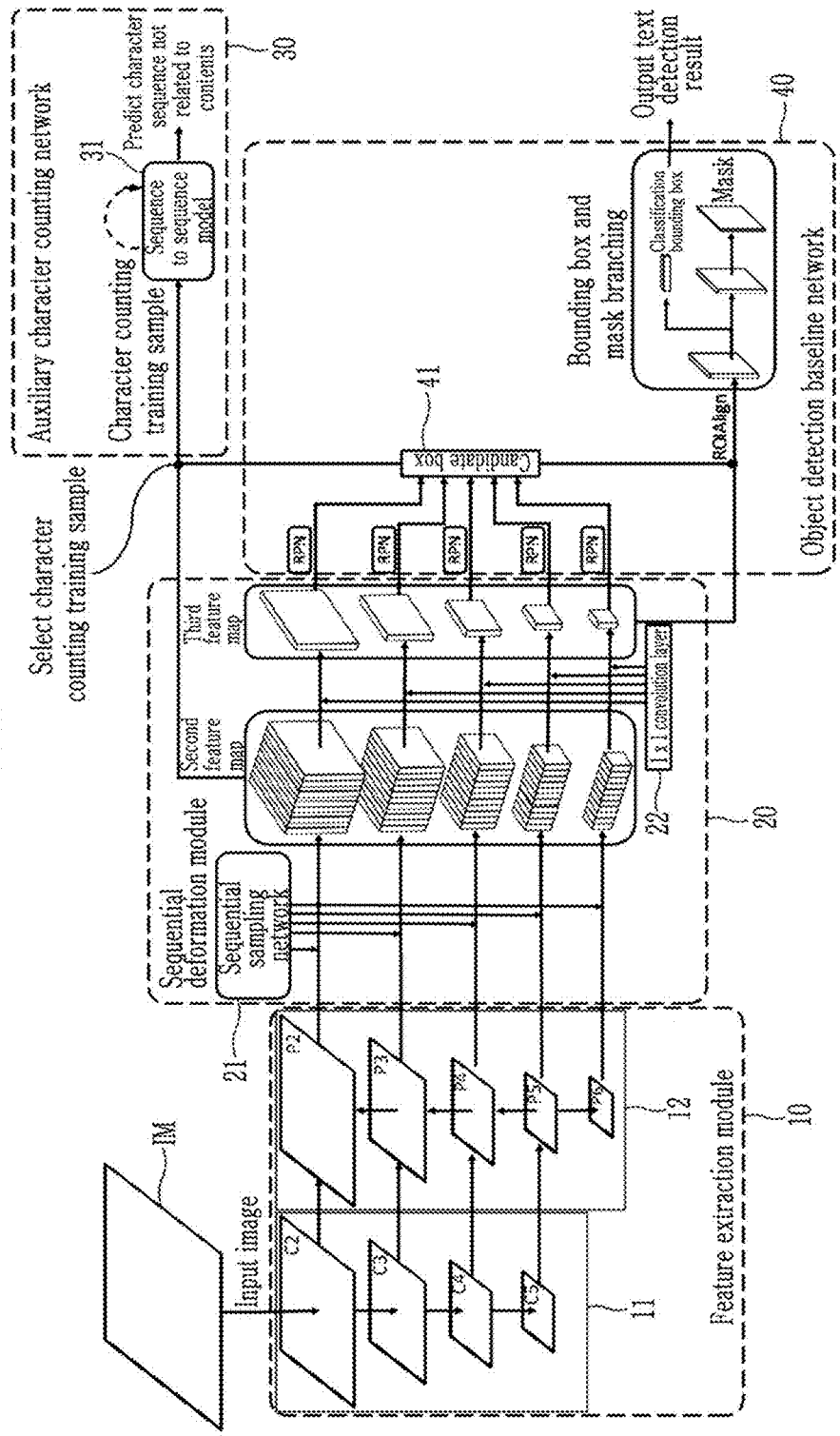
FIG. 5 is a diagram illustrating a system for detecting a scene text according to various exemplary embodiments of the present invention.

Referring to the scene text detecting system 1 illustrated in FIG. 5, the object detection baseline network 40 is implemented as Mask R-CNN. The object detection baseline network 40 performs text area candidate box extraction for the input third feature map, and additionally obtains a text area prediction result as a system output through text area classification and regression fitting of a text area bounding box. In a training stage, the object detection baseline network 40 utilizes two objective functions of text area classification and text area bounding box regression, and performs training by adjusting a neural network node parameter by a gradient descent method by use of deep neural network error backpropagation. Furthermore, in the training stage, the object detection baseline network 40 selects a text area candidate box in the object detection baseline network 40 by use of sample ground-truth bounding box information, utilizes a center location of a candidate box (i.e., a positive type candidate box, abbreviated as a positive candidate box) matching a ground-truth bounding box for selecting a feature sequence on the second feature map, and sends the selected feature sequence to the auxiliary character counting network 30.

The auxiliary character counting network 30 performs character sequence modeling for the feature sequence selected in the positive candidate box of the second feature map to predict and generate a content-independent character sequence. That is, during a modeling process, the auxiliary character counting network 30 considers only whether the character appears, does not consider specific contents of the character, and counts only the character in the sequence. Counting only the character during the sequence may be similar to counting only the character when people do not know a specific language character. The objective function of the auxiliary character counting network 30 utilizes a negative log likelihood function generally used in deep learning sequence modeling, configures the objective function for the content-independent character sequence prediction result by use of content-independent character information of a real text label of a corresponding text area, and forms the auxiliary character counting supervised learning mechanism through the configured objective function. Jointly participating in training by the objective function of the auxiliary character counting network 30 and the objective function of the object detection baseline network 40 may help to guide the sequential modification module 20 to adapt to deformation of various text areas.

All models including the feature extraction module 10, the sequential deformation module 20, the auxiliary character counting network 30, and the object detection baseline network 40 may perform model parameter learning through the deep learning based end-to-end multi-task optimization training regardless of the complicated postprocessing step, that is, during the training process, the multi-task objective function includes the objective function of the text area classification and the text area bounding box regression of the object detection baseline network 40, and the content-independent character sequence prediction objective function of the auxiliary character counting network 30 to finally implement a scene text detecting system which may be applied to the deformation of various text areas.

FIG. 2A, FIG. 2B, FIG. 2C, and FIG. 2D are comparison diagrams in sampling location between a conventional 3×3 standard convolution and sequential deformation according to various exemplary embodiments of the present invention, and for more clear visualization, the sampling location is mapped to an input image in FIG. 2A, FIG. 2B, FIG. 2C, and FIG. 2D.

Figure 2A:
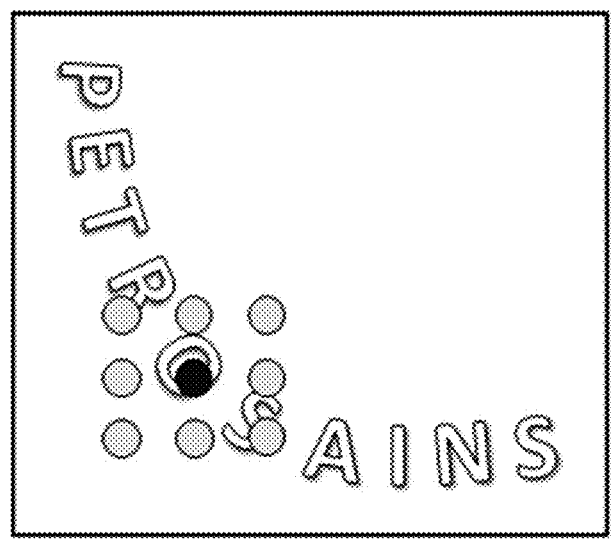
FIG. 2A, FIG. 2B, FIG. 2C, and FIG. 2D are comparison diagrams in sampling location between a conventional 3×3 standard convolution and sequential deformation according to various exemplary embodiments of the present invention.
Figure 2B:
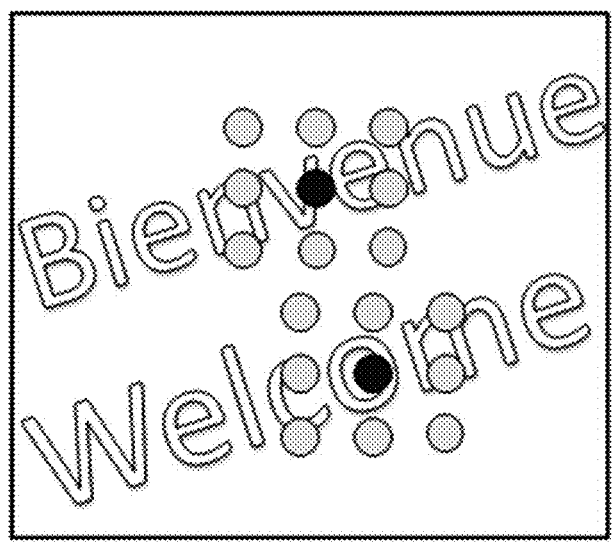
Figure 2C:
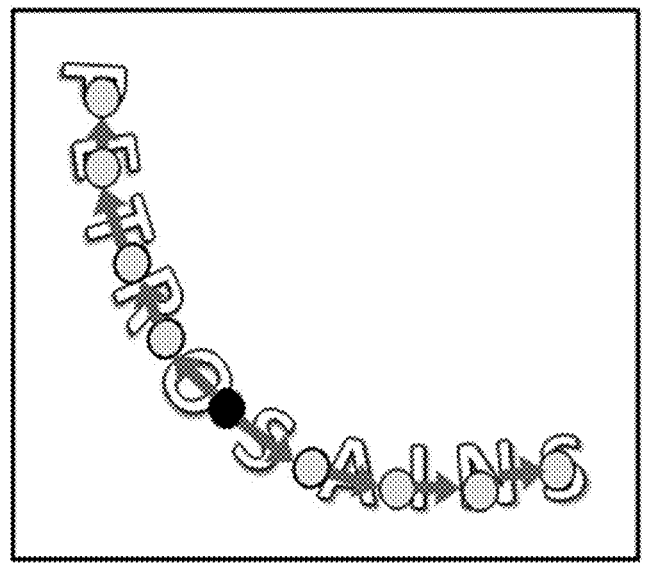
Figure 2D:
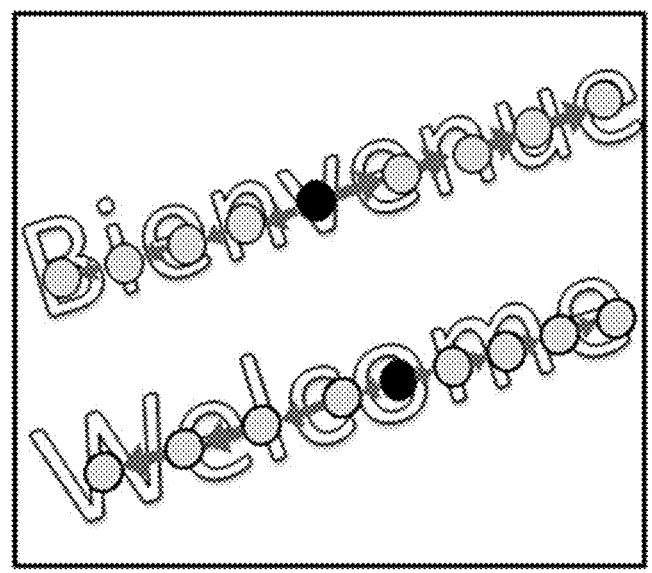

FIG. 2A and FIG. 2B illustrate two samples showing sampling locations of the standard convolution. A block dot indicates the center location of the convolution. FIG. 2C and FIG. 2D illustrate two samples corresponding to FIG. 2A and FIG. 2B, and FIG. 2C and FIG. 2D output a result by use of two different-direction sequence sampling networks. In FIGS. 2C and 2D, a block dot indicates a sequence sampling start location, and each gray arrow indicates an offset predicted in one time step.

Hereinafter, the method for detecting the scene text based on the sequential deformation module 20 and the auxiliary character counting supervised learning mechanism will be additionally described through a specific exemplary embodiment of the present invention.

The exemplary embodiment of the present invention is implemented by use of technologies of a PyTorch (https://github.com/pytorch/pytorch) deep learning framework, a Mask R-CNN object detection reference framework in an MMDetection open source object detection tool kit (https://github.com/open-mmlab/mmdetection), and a Transformer multi-head self attention network (https://github.com/jadore801120/attention-is-all-you-need-pytorch) in a computer supporting NVIDIA Tesla V100 GPU parallel computing.

Figure 3:
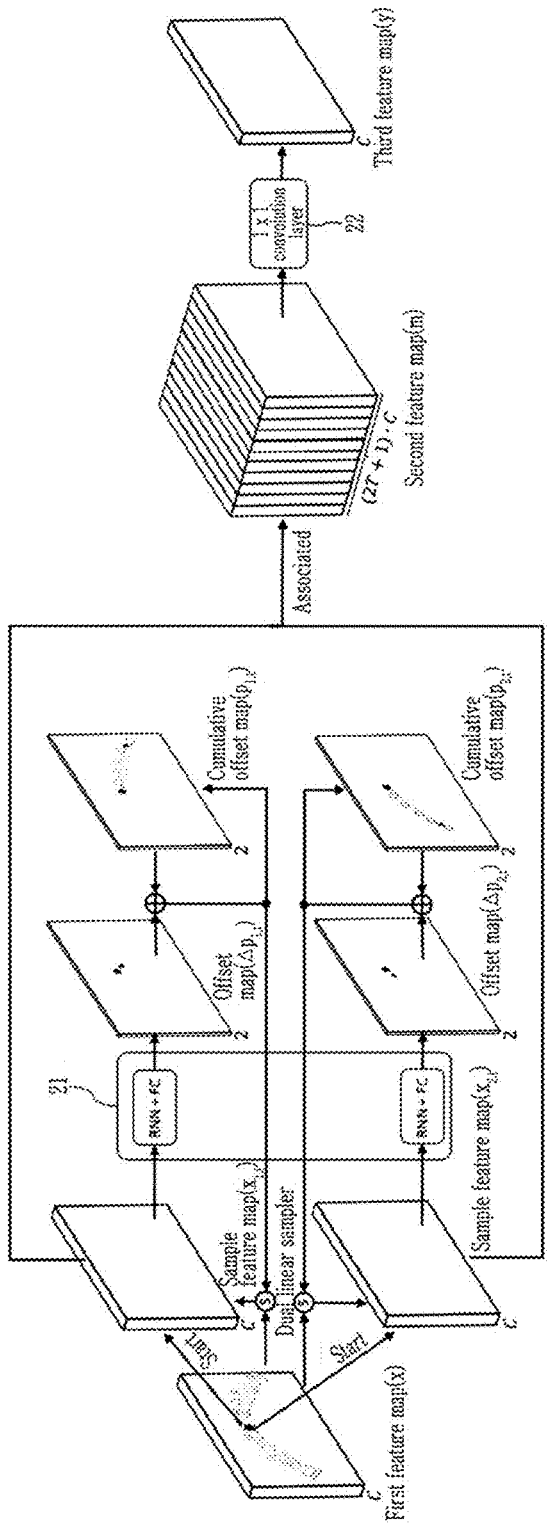
FIG. 3 is a structural schematic diagram of a sequential deformation module according to various exemplary embodiments of the present invention.

First, as illustrated in FIG. 3, the sequential deformation module 20 first performs a sampling operation in a sequential scheme, and then performs a 1×1 convolution on a second feature map m to implement feature aggregation. Here, the second feature map m may be obtained by concatenation in the channel dimension for a first feature map x and all sampled feature maps, and the second feature map may appropriately capture an expression of a text instance level.

The sequential deformation module sets, as a start location, each pixel p defined as an integer coordinate on the first feature map x, and sequentially generates two relative sampling location branches $S_d=\{p_{d,t}|t=1, \ldots, T\}$ (d=1,2) by offset accumulation to construct two sampling paths. This is shown in Equation 1 below.

$$p_{d,t+1}=p_{d,t}+\Delta p_{d,t}, t=0, \ldots, T-1 \quad \text{[Equation 1]}$$

Here, $p_{d,0}=(0,0)$ (d=1,2) and $\Delta p_{d,t}$ represent current 2D offsets, and T represents a predetermined repetition number of times. A default number of repetition times T is 7. Since the sequential sampling network is intensively executed, in each time step t, all $\Delta p_{d,t}$ (d=1,2) form one offset map, all $p_{d,t}$ (d=1,2) form a cumulative offset map, and all sampled features $x(p+p_{d,t})$ (d=1,2) form the sampled feature maps $x_{d,t}(x_{d,t}(p)=x(p+p_{d,t}))$. Bilinear interpolation is performed for a feature map of a pixel point adjacent to the sampling location by use of a bilinear sampler to obtain $x(p+p_{d,t})$. Since the bilinear interpolation may be differentiated, the training process of the sequential deformation module 20 is a complete end-to-end optimization training process.

Since the sequential sampling network 21 is intensively executed one by one for each pixel in the first feature map x, each of all pixels on the first feature map x becomes a start position p. That is, P includes all pixel positions {(0,0), (0,1), ..., (H−1,W−1)} on an H×W image. H represents a height of the first feature map x and W represents a width of the first feature map x.

The sequential sampling process is implemented through the sequential sampling network 21. The sequential sampling network 21 includes one recurrent neural network (represented by RNN in Equation 2) and a fully-connected layer (FC) of the neural network, which is one linear layer (represented by Linear in Equation 2). Since two separate sampling paths are simultaneously generated by two independent sequential sampling networks, a prediction offset of each time is obtained based on current and previous sampled features $\{x(p+p_{d,0}), \ldots, x(p+p_{d,t})\}$ (i.e., $\{x_{d,0}(p), \ldots, x_{d,t}(p)\}$). This is shown in Equation 2 below.

$$h_{d,t}=RNN_d(x(p+p_{d,t}),h_{d,t-1})=RNN_d(x_{d,t}(p),h_{d,t+1}),$$

$$\Delta p_{d,t}=Linear_d(h_{d,t}) \quad \text{[Equation 2]}$$

A 1×1 convolution layer 22 aggregates the concatenated features from an input feature and all sampled features. The first feature map x and all sampled feature maps $x_{1,t}$ and $x_{2,t}$ are concatenated according to the channel dimension to construct the second feature map m. Then the second feature map m is processed by the 1×1 convolution layer 22 for the feature aggregation to obtain the third feature map y. This is shown in Equation 3 below.

$$x_{d,t}(p)=x(p+p_{d,t})$$

$$m=Concat(\{x\}\cup\{x_{d,x}|d=1,2,t=1,\ldots,T\})$$

$$y=Conv_{1\times 1}(m) \quad \text{[Equation 3]}$$

Here, Concat(·) means a concatenation operation according to the channel dimension, the number of channels of the second feature map m is (2T+1) C, and here, C represents the number of channels of an input feature map, and 2T+1 corresponds to 2T sampled feature maps and the first feature map x which is one first feature map. $Conv_{1\times 1}(\cdot)$ means the 1×1 convolution layer 22. That is, the 1×1 convolution layer 22 is implemented by use of one convolution layer in which a size of a convolution kernel is 1×1 and the number of convolution kernels is k, and when k which is the number of convolution kernels is set to be equal to (2T+1)·C which is the number of channels of the second feature map m, the number of channels of the third feature map y is also (2T+1)·C.

As illustrated in FIG. 5, the feature extraction module 10 may receive an image IM regarding a scene, and obtain a plurality of feature maps (e.g., C2 to C5 of FIG. 5) of the image IM from a backbone network, and apply a feature pyramid network (FPN) to the plurality of feature maps C2 to C5 and obtain a plurality of first feature maps P2 to P6. The sequential sampling network 21 is shared for the plurality of first feature maps P2 to P6, and the 1×1 convolution layer 22 is shared for a plurality of second feature maps. Each of a plurality of third feature maps generated by the sequential deformation module 20 is delivered to a regional proposal network (RPN) to get the info of candidate box 41. The info of candidate box 41 and the plurality of third feature maps are used in the ROIAlign layer to extract a regional feature.

Figure 4:
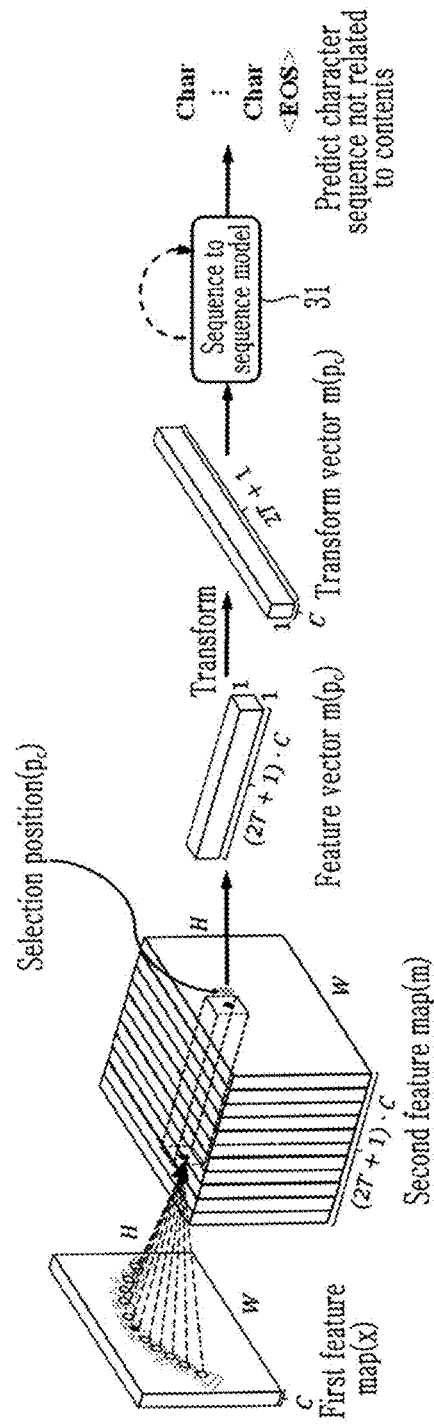
FIG. 4 is a schematic diagram of an auxiliary character counting process according to various exemplary embodiments of the present invention.

Next, an auxiliary character counting supervised learning task is modeled to one sequence-to-sequence problem, and a detailed process is illustrated in FIG. 4.

In various exemplary embodiments of the present invention, a training sample is selected in the second feature map m. In various exemplary embodiments of the present invention, by use of a positive candidate box obtained from the regional proposal network (RPN) in the object detection baseline network 40, the training sample is selected near a center area of the positive candidate box. One selected positive candidate box is contracted toward the enter with a provided shrunk coefficient σ. The shrunk coefficient σ is set to 0.1 and 0.3 for backbone networks of ResNet-18 and ResNet-50, respectively. In various exemplary embodiments of the present invention, in a contracted area, one position is randomly determined as a selection position ($p_c$), and one character counting training sample is generated. In various exemplary embodiments of the present invention, in respect to a first feature map (x) level-i candidate box, the character counting training sample is generated from corresponding level-i second feature map mi.

When the selection position ($p_c$) is given, a feature vector m($p_c$) is obtained in which the number of channels is (2+1)·C, and a feature vector is reshaped to form a transform vector m' ($p_c$) in which a length is 2T+1 and the number of channels is C, in an exemplary embodiment of the present invention. The transform vector m' ($p_c$) forms one character counting training sample. In an actual determination, the bilinear interpolation is performed for the second feature map mi of a pixel adjacent to the selection position($p_c$) to obtain the feature vector m($p_c$), in an exemplary embodiment of the present invention.

The sequence-to-sequence model 31 is implemented as a single-layer transformer network, and predicts a content-independent character sequence. The single-layer transformer network classifies the character sequence into four signs in each time step. Four signs include a sequence start sign "<SOS>", a sequence end sign "<EOS>", a sequence supplementation sign for facilitating data parallel calculation "<PAD>", and character sign not related to contents, "<Char>". Character sign not related to contents, "<Char>" represents existence of one character, and detailed code contents of a character classified into the character sign <Char> are disregarded.

In various exemplary embodiments of the present invention, a text ground-truth sequence, the character code is substituted with the <Char> sign not related to the contents one by one to obtain a character sequence not related to contents of a text ground-truth. That is, the character sequence includes continuous <Char> signs, and the number of <Char> signs is equal to the number of characters in a corresponding text ground-truth. A character sequence not related to contents of the text ground-truth includes one sequence end sign "<EOS>" lastly.

In the training stage, a decoder performs a masking operation for the character sequence not related to the contents of the text ground-truth on a multi-headed self-attention layer. A calculation process of the decoder may be repeated, and during forward calculation, the decoder may observe only an input text ground-truth before the current time step.

The objective function of the auxiliary character counting network 30 is shown in Equation 4 below.

$$L_{count} = -\log p(s|\text{reshape}(m(p_c)))$$ [Equation 4]

Here, reshape means that the feature vector $m(p_c)$ in which the number of channels is $(2T+1) \cdot C$ is reshaped and transformed into the transform vector $m'(p_c)$ in which a length is and the number of channels is C. "s" represents the character sequence not related to the contents of the corresponding text ground-truth. $p(s|\text{reshape}(m(p_c)))$ represents an average softmax value of prediction of the character sequence not related to the text ground-truth output from the single-layer transformer network, and a calculation method of the softmax value is the same as a general deep learning method.

In the training stage, the objective function $L_{count}$ of the auxiliary character counting network 30 and the objective function of the object detection baseline network 40 are jointly operated. Through an error reverse wave generally used for the neural network, the model parameter is adjusted and the objective function is minimized by use of the gradient descent method in an exemplary embodiment of the present invention.

In various exemplary embodiments of the present invention, the recurrent neural network in the sequence deformation module 20 utilizes the single-layer general RNN, and the number of hidden states among them is 64, an activation function is ReLU, and an initialization scheme of a network parameter is Xavier Gaussian initialization. The auxiliary character counting network 30 utilizes the single-layer general transformer, and an output dimension of a feed forward layer of the single-layer general transformer is 128, the number of attention heads is 1, an activation function is GeLU, a dropout ratio is 0.1, and a network function initialization scheme is Xavier Gaussian initialization.

Last, the sequential deformation module 20 and the auxiliary character counting supervised learning mechanism may be easily integrated into other general object detection frameworks, and are illustrated in FIG. 5.

The sequential deformation module 20 and the auxiliary character counting supervised learning mechanism according to various exemplary embodiments of the present invention may be integrated into Mask R-CNN as the object detection reference framework. However, of the present invention an exemplary embodiment of the present invention may be integrated into another type of object detection reference framework. The sequential deformation module 20 may be positioned between the feature maps of the feature pyramid network (FPN) and the regional proposal network (RPN). Since the FPN and the RPN are different feature levels, the sequential deformation module 20 is shared among different feature levels. That is, the sequential deformation module 20 processes different feature levels of feature maps with the same parameter. Simultaneously a RoIAlign layer may extract a regional feature from the third feature map y output from the sequential deformation module 20.

In an ICDAR 2017 MLT (http://rrc.cvc.uab.es/?ch=8), ICDAR 2015 (https://rrc.cvc.uab.es/?ch=4), Total-Text (https://github.com/cs-chan/Total-Text-Dataset), and SCUT-CTW1500 (https://github.com/Yuliang-Liu/Curve-Text-Detector/tree/master/data) data set, an exemplary embodiment of the present invention is trained by use of a training set, and a model capability according to an exemplary embodiment of the present invention is tested by use of a test set corresponding to the training set. A detailed scheme of training in each data set is as follows.

According to a general method of deep learning, by use of an ImageNet pre-training model, 140 rounds are trained by an ICDAR 2017 MLT training set (when all training set samples are processed once, 1 round is trained). A learning rate up to an 80-th round is set to $4 \times 10^{-2}$, a learning rate up to 81 to 125-th rounds is set to $4 \times 10^{-3}$, and a learning rate up to 126 to 140-th rounds is set to $4 \times 10^{-4}$.

By use of a model trained in the ICDAR2017MLT data set as the pre-training model, 120 rounds are trained with the ICDAR 2015 training set. The learning rate up to the 80-th round is set to $4 \times 10^{-3}$ and the learning rate of the 81-st to 120-th rounds is set to $4 \times 10^{-4}$.

Total-text: By use of the model trained in the ICDAR2017MLT data set as the pre-training model, 140 rounds are trained with the Total-text training set. The learning rate up to the 80-th round is set to $4 \times 10^{-3}$ and the learning rate of the 81-st to 140-th rounds is set to $4 \times 10^{-4}$.

SCUT-CTW1500: By use of the model trained in the ICDAR2017MLT data set as the pre-training model, 140 rounds are trained with the SCUT-CTW1500 training set. The learning rate up to the 80-th round is set to $4 \times 10^{-3}$ and the learning rate of the 81-st to 140-th rounds is set to $4 \times 10^{-4}$.

During the training process, a batch size of GPU parallel calculation is set to 32. Setting other training hyperparameters coincides with setting used for general deep learning.

Tables, 1, 2, and 3 are experimental results for various exemplary embodiments of the present invention.

Table 1 shows an experimental result for each of a case where only the sequential deformation module 20 is coupled to the Mask R-CNN object detection baseline network 40 and a case where the sequential deformation module 20 and the auxiliary character counting supervised learning mechanism are coupled in the ICDAR 2017 MLT multi-language text detection data set.

An F1 score is the harmonic mean of precision and recall rate, and is used as a comprehensive evaluation index.

The result of Table 1 shows the validity of the sequential deformation module 20 and the auxiliary character counting supervised learning mechanism.

Table 1 shows a validity verification result in the ICDAR2017 MLT data set of the sequential deformation module 20 and the auxiliary character counting supervised learning mechanism. Baseline represents a Mask R-CNN object detection reference model, and in various exemplary embodiments of the present invention, the backbone network has adopted two types of implementation, i.e., ResNet-18 and ResNet-50. SDM means the sequential deformation module 20 and ACC means the auxiliary character counting supervised learning mechanism.

TABLE 1

| Method | Backbone network | Precision (%) | Recall rate (%) | F1 score (%) |
|---|---|---|---|---|
| Baseline | ResNet-18 | 80.36 | 70.04 | 74.84 |
| Baseline + SDM | ResNet-18 | 81.80 | 70.31 | 75.62 |
| Baseline + SDM + ACC | ResNet-18 | 82.14 | 70.72 | 76.00 |
| Baseline | ResNet-50 | 82.10 | 72.62 | 77.07 |
| Baseline + SDM | ResNet-50 | 83.34 | 72.64 | 77.62 |
| Baseline + SDM + ACC | ResNet-50 | 84.16 | 72.82 | 78.08 |

Table 2 includes a result according to various exemplary embodiments of the present invention and a result according to a method in other recent opened literatures in the ICDAR 2017 MLT multi-language text and the ICDAR 2015 scene text detection data set.

In Table 2, the F1 score is used as the evaluation index. In various exemplary embodiments of the present invention, in two types of data sets ICDAR 2017 MLT and ICDAR 2015, a relatively high detection capability is obtained.

Table 2 shows the robustness of the sequential deformation module 20 and the auxiliary character counting supervised learning mechanism.

Table 2 includes a comparison result between the exemplary embodiment of the present invention and the opened literature in the ICDAR2017 MLT and ICDAR 2015 data sets. The SDM means the sequential deformation module 20, ACC means the auxiliary character counting supervised learning mechanism, and MT means a capability test that processes the input image by multi-scale image scaling, and then performs text detection again.

PSENet (https://arxiv.org/abs/1903.12473). FOTS (https://arxiv.org/abs/1801.01671) and PMTD (https://arxiv.org/abs/1903.11800) are conventional methods introduced in the opened literature.

TABLE 2

| | Data set | | | | | |
|---|---|---|---|---|---|---|
| | ICDAR 2017 MLT | | | ICDAR 2015 | | |
| method | Precision (%) | Recall rate (%) | F1 score (%) | Precision (%) | Recall rate (%) | F1 score (%) |
| PSENet | 77.01 | 68.40 | 72.45 | 89.30 | 85.22 | 87.21 |
| FOTS + MT | 81.86 | 62.30 | 70.75 | 91.85 | 87.92 | 89.84 |
| PMTD | 85.15 | 72.77 | 78.48 | 91.30 | 87.43 | 89.33 |
| PMTD + MT | 84.42 | 76.25 | 80.13 | — | — | — |
| Exemplary embodiment of the present invention (ResNet-18 + SDM + ACC) | 82.14 | 70.72 | 76.00 | 91.14 | 84.69 | 87.80 |
| Exemplary embodiment of the present invention (ResNet-18 + SDM + ACC + MT) | 85.44 | 73.68 | 79.13 | 90.15 | 88.16 | 89.14 |
| Exemplary embodiment of the present invention (ResNet-50 + SDM + ACC) | 84.16 | 72.82 | 78.08 | 88.70 | 88.44 | 88.57 |
| Exemplary embodiment of the present invention (ResNet-50 + SDM + ACC + MT) | 86.79 | 75.26 | 80.61 | 91.96 | 89.22 | 90.57 |

Table 3 includes a comparison result between the methods of the exemplary embodiment of the present invention and the method in other recent opened literature in the scene text detection data set of Total-Text and SCUT-CTW1500. Total-Text and SCUT-CTW1500 mainly include image samples with multi-oriented and curved scene text.

An experimental result of Table 3 shows that a very high detection capability may be obtained even for the curved texts in Total-Text and SCUT-CTW1500 according to various exemplary embodiments of the present invention. Accordingly, Table 3 shows that the sequential deformation module 20 and the auxiliary character counting supervised learning mechanism may adapt even to the image sample with curved scene text.

Table 3 includes a comparison result for data sets of Total-Text and SCUT-CTW1500, respectively. The SDM means the sequential deformation module 20, ACC means the auxiliary character counting supervised learning mechanism, and MT means a multi-scale image test. PAN (https://arxiv.org/abs/1908.05900) represents a conventional method included in the opened literature.

In a method for detecting a scene text based on the sequential deformation module 20 and the auxiliary character counting supervisory mechanism according to various exemplary embodiments of the present invention, all models including the feature extraction module 10, the sequential deformation module 20, the auxiliary text count network 30, and the object detection baseline network 40 may perform model parameter learning through a deep learning based end-to-end multi-task optimization training without the complicated postprocessing step. That is, during the training process, the multi-task objective function includes an objective function of the text area classification and the text area bounding box regression of the object detection baseline network 40 and the character sequence prediction objective function not related to the contents of the auxiliary character counting network 30 to finally implement a system for detecting a scene text, which may be applied to deformation of various text areas.

those skilled in the art may be variously modified and change the present invention according to the above-described contents.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for detecting a scene text based on a feature extraction module, a sequential deformation module, an auxiliary character counting network, and an object detection baseline network, the method comprising:
   extracting, by the feature extraction module, a first feature map for a scene image input based on a convolutional neural network, and delivering the first feature map to a sequential deformation module;
   obtaining, by the sequential deformation module, sampled feature maps corresponding to sampling positions by performing iterative sampling through predicting an

TABLE 3

|  | Data set | | | | | |
| --- | --- | --- | --- | --- | --- | --- |
|  | Total-Text | | | SCUT-CTW1500 | | |
| method | Precision (%) | Recall rate (%) | F1 score (%) | Precision (%) | Recall rate (%) | F1 score (%) |
| PSENet | 84.02 | 77.96 | 80.87 | 84.84 | 79.73 | 82.20 |
| PAN | 89.30 | 81.00 | 85.00 | 86.40 | 81.20 | 83.70 |
| Baseline system (ResNet-50) | 87.44 | 84.93 | 86.16 | 84.16 | 81.99 | 83.06 |
| an exemplary embodiment of the present invention (ResNet-50 + SDM + ACC) | 89.24 | 84.70 | 86.91 | 85.82 | 82.27 | 84.01 |
| an exemplary embodiment of the present invention (ResNet-50 + SDM + ACC + MT) | 90.85 | 86.03 | 88.37 | 88.40 | 84.42 | 86.36 |

In the description of the present specification, terms such as "first", "second", "third" are just used for explanation, and should not be appreciated as specifying or implying relative importance or implying the quantity of technical features. Hereinabove, the description of the exemplary embodiment of the present invention is just for describing the technique of the present invention and is neither for completely integrating the present invention nor for limiting the present invention to an exact form described. of course, offset for each pixel of the first feature map, obtaining a second feature map by performing a concatenation operation in deep learning according to a channel dimension for the first feature map and the sampled feature maps obtained by the iterative sampling, and delivering the second feature map to an auxiliary character counting network;

obtaining, by the sequential deformation module, a third feature map by performing a feature aggregation operation for the second feature map in the channel dimension, and delivering the third feature map to the object detection baseline network; and performing, by the object detection baseline network, text area candidate box extraction for the third feature map and obtaining a text area prediction result as a scene text detection result through regression fitting.

2. The method of claim 1, further including:

a training stage of performing, by the object detection baseline network, a training by adjusting a neural network node parameter by a gradient descent method by use of various objective functions and deep neural network error backpropagation, wherein the various objective functions include objective functions of text area classification and text area bounding box regression.

3. The method of claim 2, wherein the training stage includes, selecting, by the object detection baseline network, a text area candidate box in the object detection baseline network by use of sample ground-truth bounding box information, and selecting a feature sequence on the second feature map by use of a center position of a positive candidate box matching a ground-truth bounding box and sending the selected feature sequence to the auxiliary character counting network.

4. The method of claim 1, further including:

performing, by the auxiliary character counting network, character sequence modeling for a feature sequence selected in a positive candidate box of the second feature map, and predicting and generating a content-independent character sequence; and adopting, by the auxiliary character counting network, a negative log likelihood function used in deep learning sequence modeling as an objective function; and configuring, by the auxiliary character counting network, the objective function for the content-independent character sequence prediction result by use of content-independent character information of a real text label of a corresponding text area, and forming an auxiliary character counting supervised learning mechanism through the objective function.

5. The method of claim 4, further including:

jointly participating in the training by an objective function of the auxiliary character counting network and an objective function of the object detection baseline network, wherein the jointly participating guides the sequential deformation module to adapt to deformation of various text areas.

6. The method of claim 1, wherein the first feature map is a matrix of H×W×C, wherein H represents a height of the feature map, W represents a width of the feature map, and C represents a number of channels of the feature map.

7. A system for detecting a scene text, the system comprising:

a feature extraction module configured for extracting a first feature map for a scene image input based on a convolutional neural network; and a sequential deformation module configured for receiving the first feature map, obtaining sampled feature maps corresponding to sampling positions by performing iterative sampling through predicting an offset for each pixel of the first feature map, and obtaining a second feature map by performing a concatenation operation in deep learning according to a channel dimension for the first feature map and the sampled feature maps obtained by the iterative sampling, wherein the sequential deformation module includes two separate sequence sampling networks and one convolution layer in which a size of a convolution kernel is 1×1 and a number of the convolution kernels is k, wherein each of the two separate sequence sampling networks includes a bilinear sampler, a recurrent neural network, and a linear layer, wherein the two separate sequence sampling networks sample features in two different directions starting at a same start position on the first feature map and in a sequence sampling network provided in each time step, and a current position is obtained by adding a current accumulative offset to the start position on the first feature map, wherein the bilinear sampler outputs a feature sampled for the current position, wherein the recurrent neural network receives the feature sampled for the current position, and generates a hidden state, and wherein the linear layer receives the hidden state, predicts a 2D vector type offset for the current position, and obtains a new cumulative offset by adding the predicted offset to the current cumulative offset.

8. The system of claim 7, wherein the sequential deformation module obtains the second feature map by concatenation the first feature map and all sampled feature maps, selects a feature vector at a position in which a number of channels is (2T+1)·C on the second feature map, and obtains a feature sequence in which a length is 2T+1 and the number of channels is C by reshaping the selected feature vector, wherein the T and the C are natural numbers.

9. The system of claim 8, wherein the sequential deformation module obtains a third feature map by performing a feature aggregation operation by use of a convolution layer in a channel dimension of the second feature map, and wherein in the convolution layer, the size of the convolution kernel is 1×1, the number of convolution kernels is k, and k which is the number of convolution kernels is set to be equal to (2T+1)·C which is the number of channels of the second feature map.

10. The system of claim 8, further including:

an auxiliary character counting network as a sequence-to-sequence model in deep learning, which receives the feature sequence from the sequential deformation module.

11. The system of claim 10, wherein the auxiliary character counting network receives the feature sequence, a start sign <SOS>, or a sign predicted at a previous time step, and outputs a next prediction sign until outputting an end sign <EOS> by use of a single-layer multi-head self attention decoder.

12. The system of claim 7, further including an object detection baseline network, wherein the sequential deformation module is further configured for obtaining a third feature map by performing a feature aggregation operation for the second feature map in the channel dimension, and delivering the third feature map to the object detection baseline network, and wherein the object detection baseline network is configured for performing text area candidate box extraction for the third feature map and obtaining a text area prediction result as a scene text detection result through regression fitting.

13. The system of claim 12,
wherein the object detection baseline network is further configured for a training stage of performing a training by adjusting a neural network node parameter by a gradient descent method by use of various objective functions and deep neural network error backpropagation, and
wherein the various objective functions include objective functions of text area classification and text area bounding box regression.

14. The system of claim 13, wherein the training stage includes selecting, by the object detection baseline network, a text area candidate box in the object detection baseline network by use of sample ground-truth bounding box information, and selecting a feature sequence on the second feature map by use of a center position of a positive candidate box matching a ground-truth bounding box and sending the selected feature sequence to the auxiliary character counting network.

15. The system of claim 10, wherein the auxiliary character counting network is configured for:
performing character sequence modeling for a feature sequence selected in a positive candidate box of the second feature map, and predicting and generating a content-independent character sequence; and
adopting a negative log likelihood function used in deep learning sequence modeling as an objective function; and
configuring an objective function for a content-independent character sequence prediction result by use of content-independent character information of a real text label of a corresponding text area, and forming an auxiliary character counting supervised learning mechanism through the objective function.

16. The system of claim 13, wherein the auxiliary character counting network is configured for:
performing character sequence modeling for a feature sequence selected in a positive candidate box of the second feature map, and predicting and generating a content-independent character sequence;
adopting a negative log likelihood function used in deep learning sequence modeling as an objective function; and
configuring the objective function for a content-independent character sequence prediction result by use of content-independent character information of a real text label of a corresponding text area, and forming an auxiliary character counting supervised learning mechanism through the objective function.

17. The system of claim 16, wherein an objective function of the auxiliary character counting network and an objective function of the object detection baseline network are configured for jointly participating in the training
wherein the jointly participating guides the sequential deformation module to adapt to deformation of various text areas.

18. The system of claim 7, wherein the first feature map is a matrix of H×W×C, wherein H represents the height of the feature map, W represents the width of the feature map, and C represents a number of channels of the feature map.

* * * * *